US008019887B2

(12) United States Patent
Chalupsky et al.

(10) Patent No.: US 8,019,887 B2
(45) Date of Patent: Sep. 13, 2011

(54) METHOD, SYSTEM, AND PROGRAM FOR MANAGING A SPEED AT WHICH DATA IS TRANSMITTED BETWEEN NETWORK ADAPTORS

(75) Inventors: David L. Chalupsky, Banks, OR (US); James M. Ostrowski, Tigard, OR (US); Thomas L. Stachura, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2716 days.

(21) Appl. No.: 10/656,652

(22) Filed: Sep. 4, 2003

(65) Prior Publication Data

US 2005/0055456 A1 Mar. 10, 2005

(51) Int. Cl.
G06F 15/16 (2006.01)

(52) U.S. Cl. ........................................... 709/233
(58) Field of Classification Search ............... 709/233
See application file for complete search history.

(56) References Cited

U.S. PATENT DOCUMENTS

| | | | | | |
|---|---|---|---|---|---|
| 5,881,240 | A | * | 3/1999 | Asano | 709/233 |
| 6,026,494 | A | * | 2/2000 | Foster | 713/320 |
| 6,298,042 | B1 | * | 10/2001 | Murase et al. | 370/235 |
| 6,389,476 | B1 | * | 5/2002 | Olnowich | 709/233 |
| 6,529,957 | B1 | * | 3/2003 | Joergensen | 709/233 |
| 6,665,810 | B1 | * | 12/2003 | Sakai | 713/600 |
| 6,789,130 | B1 | * | 9/2004 | Benayoun et al. | 709/250 |
| 7,054,947 | B2 | * | 5/2006 | Yun | 709/233 |
| 7,171,483 | B2 | * | 1/2007 | Klein | 709/232 |
| 2003/0023665 | A1 | * | 1/2003 | Matsunami et al. | 709/201 |
| 2004/0003296 | A1 | * | 1/2004 | Robert et al. | 713/300 |
| 2004/0117674 | A1 | * | 6/2004 | Gutman et al. | 713/300 |
| 2005/0055456 | A1 | * | 3/2005 | Chalupsky et al. | 709/233 |

OTHER PUBLICATIONS

Bunch, B., "An Introduction to Auto-Negotiation", [online], Feb. 19995, [Retrieved on Oct. 30, 2002]. Retrieved from the Internet at: <URL: http://www.scyld.corn/expert/NWay.html>.
Hernandez, R., "Gigabit Ethemet: Auto-Negotiation",*Power Solutions*, pp. 117-122.

(Continued)

*Primary Examiner* — Firmin Backer
*Assistant Examiner* — Brian P Whipple
(74) *Attorney, Agent, or Firm* — Caven & Aghevli LLC

(57) ABSTRACT

Provided are a method, system, and program for managing data transmissions at a local network device communicating with a linked network device over a network, wherein each network device is capable of transmitting data at different speeds. An operation is initiated to change a current transmission speed at which data is transmitted between the local and linked network devices in response to a speed change event. A determination is made of a new transmission speed different from the current transmission speed. A register is set in the local network device to indicate the new transmission speed. A speed change request and the new transmission speed are transmitted to the linked network device to cause the local and linked network devices to communicate at the new transmission speed, wherein the transmission occurs without terminating a linked exchange occurring between the local and linked network devices.

52 Claims, 4 Drawing Sheets

OTHER PUBLICATIONS

IEEE Computer Society, "802.3—IEEE Standard for Information Technology-Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications", *IEEE Std* 802.3, Mar. 8, 2002, Introduction, Section 1, Section 22, Section 23, Section 24, and Section 28, pp. i-xxiii, 1-32, 9-55, 56-131, 132-167, & 213-260 respectively.

IEEE, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications," IEEE Standard 802.11-1997, Section 9.6, p. 96, 1997.

IEEE, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications," IEEE Standard 802.11-1999, Section 9.6, p. 95, 1999.

IEEE, "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-Speed Physical Layer Extension in the 2.4 GHz Band," IEEE Standard 802.11b-1999, Section 9.6, p. 6, Jan. 20, 2000.

IEEE, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 4: Further Higher Data Rate Extension in the 2.4 GHz Band," IEEE Standard 802.11g-2003, Section 9.6, p. 12, Jun. 27, 2003.

Brenner, Pablo, "A Technical Tutorial on the IEEE 802.11 Protocol," published by BreezeCom Wireless Communications Inc., 24 pages, Jul. 18, 1996.

* cited by examiner

METHOD, SYSTEM, AND PROGRAM FOR MANAGING A SPEED AT WHICH DATA IS TRANSMITTED BETWEEN NETWORK ADAPTORS

BACKGROUND OF THE INVENTION

1. Field of the Invention

The present invention relates to a method, system, and program for managing a speed at which data is transmitted between network adaptors.

2. Description of the Related Art

In a network environment, a network adaptor card on a host computer, such as an Ethernet card, Fibre Channel card, etc., will receive Input/Output (I/O) requests or responses to I/O requests initiated from the host. Often, the host computer operating system includes a device driver to communicate with the network adaptor, and provide an interface between the host operating system and the network adaptor.

When two Ethernet cards communicate over a network, they both engage in an auto-negotiation protocol to select a highest possible common mode speed at which both are capable of communicating, such as 10 megabits per second (Mbps), 100 Mbs, 1000 Mbs, half duplex, full duplex, etc. During auto-negotiation, the Ethernet devices transmit a series of link pulses that advertise their capabilities to the other device that shares the link segment. Devices transmit a Link Code Word (LCW) that is encoded with the device transmission capabilities. The hardware in the Ethernet cards is configured to select the highest common speed between the two devices based on the capabilities communicated in the link pulses. Further details of the auto-negotiation process to select a highest common speed between two network devices is described in the publication IEEE Standard 802.3-2002 (Copyright by the Institute of Electrical and Electronic Engineers (IEEE), 2002), which publication is incorporated herein by reference in its entirety.

With prior art Ethernet auto-negotiation, the two linked devices communicate at the highest common speed, regardless of whether the highest speed is needed. Transmissions at higher speeds consume greater power than lower speed transmissions. Moreover, devices may be consuming additional power to transmit at the highest common link speed when such high speeds are not needed. For instance, lower speed transmissions may be sufficient when checking electronic mail or "surfing" the Internet. Power conservation may be especially important for battery powered computing devices, such as laptops, hand held computers, etc., and computers deployed in an energy conservation sensitive environment.

For these reasons, there is a need in the art to provide improved techniques for managing the transmission speed between network devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
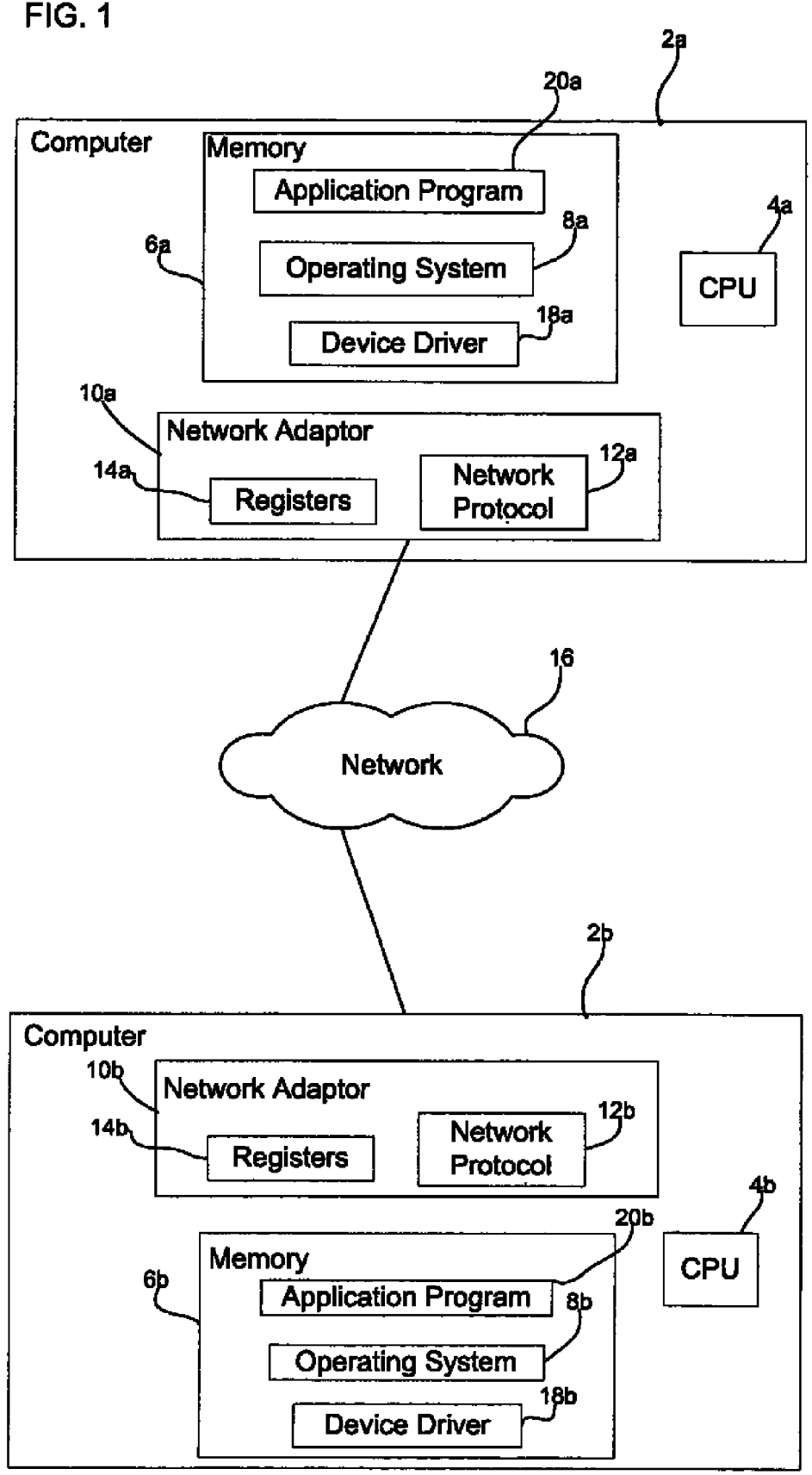
FIG. 1 illustrates a computing environment in which aspects of the invention are implemented.

FIG. 1 illustrates a computing environment in which aspects of the invention may be implemented. Two computers $2a$, $2b$ include a central processing unit (CPU) $4a$, $4b$, a memory $6a$, $6b$, an operating system $8a$, $8b$, and a network adaptor $10a$, $10b$. The network adaptors $10a$, $10b$ may be implemented in a card inserted in a slot in the computers $2a$, $2b$ or be implemented on the computer $2a$, $2b$ motherboard, e.g., LAN On Motherboard (LOM). The network adaptor $10a$, $10b$ may communicate with the computer $2a$, $2b$, respectively, using any bus protocol known in the art, such as Peripheral Component Interconnect (PCI), PCI-X, Communication Streaming Architecture (CSA), PCI-E, etc. The computers $2a$, $2b$ may comprise any computer system known in the art, such as a mainframe, server, personal computer, storage controller, workstation, laptop, handheld computer, etc. In further embodiments, the network adaptor $10a$, $10b$ may be included in alternative types of computing devices, such as telephony device, network appliance, virtualization devices, etc. Any CPU $4a$, $4b$ and operating system $8a$, $8b$ known in the art may be used. The network adaptor $10a$, $10b$ includes a network protocol $12a$, $12b$ implementing the network adaptor functions, such as auto-negotiation and others, to send and receive network packets between the network adaptors $10a$, $10b$. The network adaptors $10a$, $10b$ further include registers $14a$, $14b$ that maintain information used during adaptor operations, such as the advertised capabilities of the network adaptor, e.g., 10 Mbs, 100 Mbs, 1000 Mbs, half-duplex, full-duplex, etc. The network 16 may comprise a Local Area Network (LAN), the Internet, a Wide Area Network (WAN), Storage Area Network (SAN), etc. In certain embodiments, the network adaptors $10a$, $10b$ and network protocol $12a$, $12b$ may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

The computers $2a$, $2b$ further include a device driver $18a$, $18b$ that executes in memory $6a$, $6b$ and includes network adaptor $10a$, $10b$ specific interfaces to communicate with and control the network adaptor $10a$, $10b$ and interface between the operating system $8a$, $8b$ and the network adaptor $10a$, $10b$. The computers $2a$, $2b$ may further include a transport protocol driver (not shown) executing in memory that processes the content of messages included in the packets received at the network adaptor $12a$, $12b$ that are wrapped in a transport layer, such as TCP and/or IP, Internet Small Computer System Interface (iSCSI), Fibre Channel SCSI, parallel SCSI transport, or any other transport layer protocol known in the art. In further embodiments, the transport protocol driver operations may be performed within the network adaptor $10a$, $10b$ hardware, such as the case with a Transport Offload Engine (TOE) adaptor.

The computers $2a$, $2b$ also include one or more application programs $20a$, $20b$ that execute in memory $6a$, $6b$ to perform various operations, including transmitting and receiving data through the network adaptors $10a$, $10b$.

Figure 2:
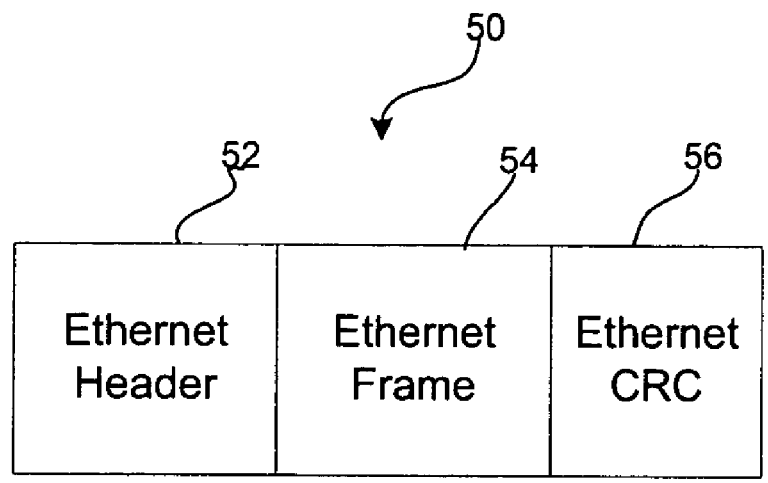
FIG. 2 illustrates a format of network packets used in accordance with embodiments of the invention.

FIG. 2 illustrates a format of network packets 50 that the network adaptors $10a$, $10b$ may transmit. The network packets 50 include an Ethernet header 52, an Ethernet data frame 54, and an Ethernet cycle redundancy check (CRC) code 56 used to perform link-level error detection at any point from start to end and including middle points in the data transmission path between the network adaptors 10a, 10b. The Ethernet packet 50 may include additional fields and flags not shown that are known in the art and used for Ethernet communication. In certain embodiments, certain data bits in an Ethernet packet 50 may be used to signal a network adaptor 10a, 10b to change the transmission speed.

Figure 3:
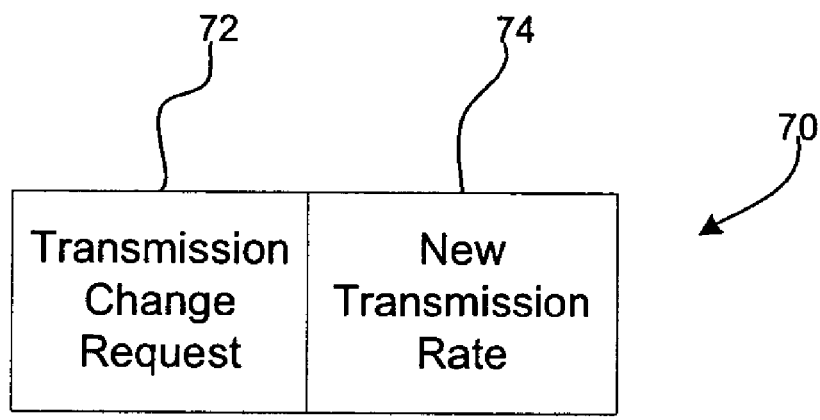
FIG. 3 illustrates data for a transmission change request in accordance with embodiments of the invention.

FIG. 3 illustrates speed change request codes 70 that may be included in the Ethernet packet 50 to indicate a speed change, including a transmission change request 72 that is the code signaling the linked network adaptor to change speeds and the new transmission speed 74. The speed change request codes 70 may be included in the Ethernet packet, in the preamble transmitted at the beginning of the packet or idle transmissions that occur between Ethernet packets. Preambles are typically transmitted during idle time periods at the beginning of each Ethernet packet transmission and are used for clock synchronization, whereas idle transmissions occur between packets.

Figure 4:
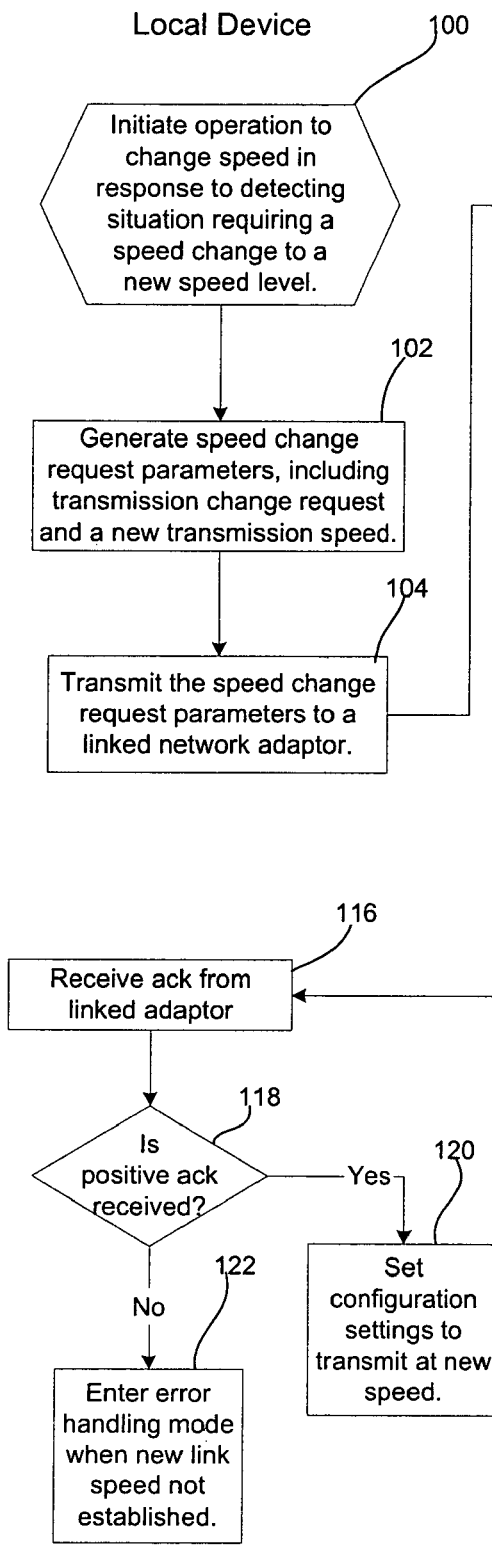
FIGS. 4, 5, and 6 illustrate logic to change a transmission speed between network adaptors in accordance with embodiments of the invention.
Figure 5:
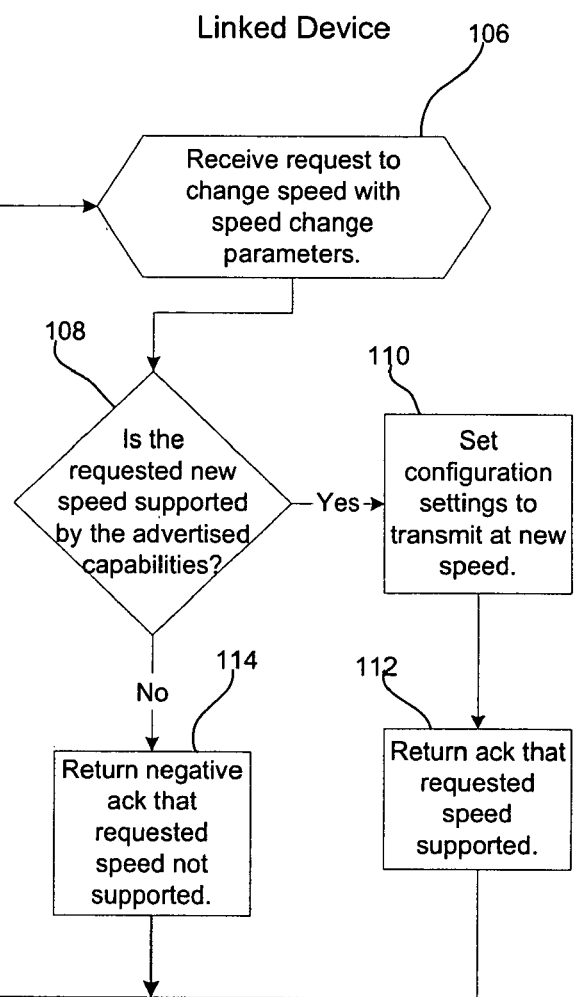

FIGS. 4 and 5 illustrate operations performed by the network protocol 12a, 12b logic of the network adaptors 10a, 10b to effect a change in transmission speed in response to the occurrence of a transmission speed change event. The network protocol 12a, 12b may be implemented as hardware logic in the network adaptor 10a, 10b. A transmission speed change event can be triggered by the device driver 18a, 18b or some other component in the computer 2a, 2b. For instance, the device driver 18a, 18b may implement an application programming interface (API) call that allows the application program 20a, 20b to change the transmission speed. If the application program 20a, 20b anticipates performing operations consuming significant network 16 resources, e.g., such as a network request for large files, such as a multi-media file (e.g., video, audio, etc.), new program or program update to download, etc., then the application program 20a, 20b may invoke the speed change API to cause the device driver 18a, 18b to, in response, perform operations to effectuate the transmission speed change operations. Additionally, a device driver 18a, 18b API may be provided to allow an application program 20a, 20b to reduce the transmission speed. In additional embodiments, the device driver 18a, 18b or some other component in the computer 2a, 2b may request the network adaptor 10a, 10b to adjust the transmission speed in response to detecting changes in network traffic at the network adaptor. For instance, if increased or decreased traffic is detected at the network adaptor 10a, 10b, then action may be taken to cause the network protocol 12a, 12b to perform the operations described in FIGS. 4 and 5. In the description in FIGS. 4 and 5, the network adaptor 10a is described as the local device where the speed change is initiated and the network adaptor 10b is described as the linked device that responds to the speed change initiated by the local device 10a. However, the network protocol 12a, 12b enables any of the network adaptors 10a, 10b to function as a local device or linked device.

With respect to FIG. 4, after initiating an operation to change the speed (at block 100), the local network adaptor 10a generates (at block 102) a speed change request 70 including a new transmission speed 74 (FIG. 3), such as 10BASE-T, 100BASE-TX, 100BASE-T4, 100BASE-T, 1000BASE-X, 1000BASE-T, etc., and transmits (at block 104) the speed change request to the linked network adaptor 10b.

FIG. 5 illustrates operations performed by the network protocol 12b in the linked network adaptor 10b. With respect to FIG. 5, upon receiving (at block 106) the speed change request, which may be implemented in bits in an Ethernet packet, the preamble that is transmitted at the beginning of the packets or the idle transmissions that occur between packets, the linked network adaptor 10b determines (at block 108) whether the requested new transmission speed 74 is supported by the advertised capabilities indicated in the registers 14b of the linked network adaptor 10b. If (at block 108) the linked network adaptor 1b supports the requested new transmission speed 74, then the linked network adaptor 10a sets (at block 110) the configuration registers 14b to implement the requested new transmission speed 74 and returns (at block 112) acknowledgment to the local network adaptor 10a that the speed change is implemented at the linked network adaptor 10b. If (at block 108) the linked network adaptor 10b does not support the requested new transmission speed 74, as indicated in the registers 14b of the linked network adaptor 10b, then negative acknowledgment is returned (at block 114) to the local network adaptor 10a indicating that the linked network adaptor 10b does not support the requested new transmission speed 74.

With respect to FIG. 4, upon the local network adaptor 10a, 10b receiving (at block 116) the acknowledgment request, if (at block 118) acknowledgment is positive, then the local network adaptor 10a sets (at block 120) the configuration registers 14a to indicate data transmission at the requested new transmission speed. Otherwise, if negative acknowledgment was returned, then the local network adaptor 10a enters (at block 122) an error handling mode. In this error handling mode, the network adaptor 10a may continue to transmit at the previously negotiated speed, which would be the highest common transmission speed between the local and linked adaptors 10a, 10b. Alternatively, the local network adaptor 10a may determine the next higher or lower transmission speed the local network adaptor 10a supports, depending upon whether the speed change request was to increase or decrease the transmission speed, respectively, and then perform the logic of FIG. 4 with respect to a next higher or lower transmission speed.

In still further alternative embodiments, the local network adaptor 10a may be aware of the transmission capabilities of the linked network adaptor 10b, which would be determined when the local and linked network adaptors 10a, 10b initially establish communication. In such embodiments, the local network adaptor 10a would select the next highest or lowest common transmission speed between the local and linked network adaptors 10a, 10b as the new transmission speed, depending on whether the speed change request is to increase or decrease the transmission speed, respectively. Such embodiments would avoid the situation where the linked network adaptor 10b returns negative acknowledgment due to the local network adaptor 10a requesting a new transmission speed the linked network adaptor 10b does not support.

Still further, the speed change request may request that the speed change be to an absolute highest or lowest speed, which would cause the local network adaptor 12a to attempt communication at the very highest or lowest supported speed, respectively. Additionally, the speed change request may request a speed that is some number of levels higher or lower than the current speed, assuming the local device supports multiple different speed levels. In such case, the local network adaptor would attempt to establish communication at the requested number of levels higher or lower than the current transmission speed.

Figure 6:
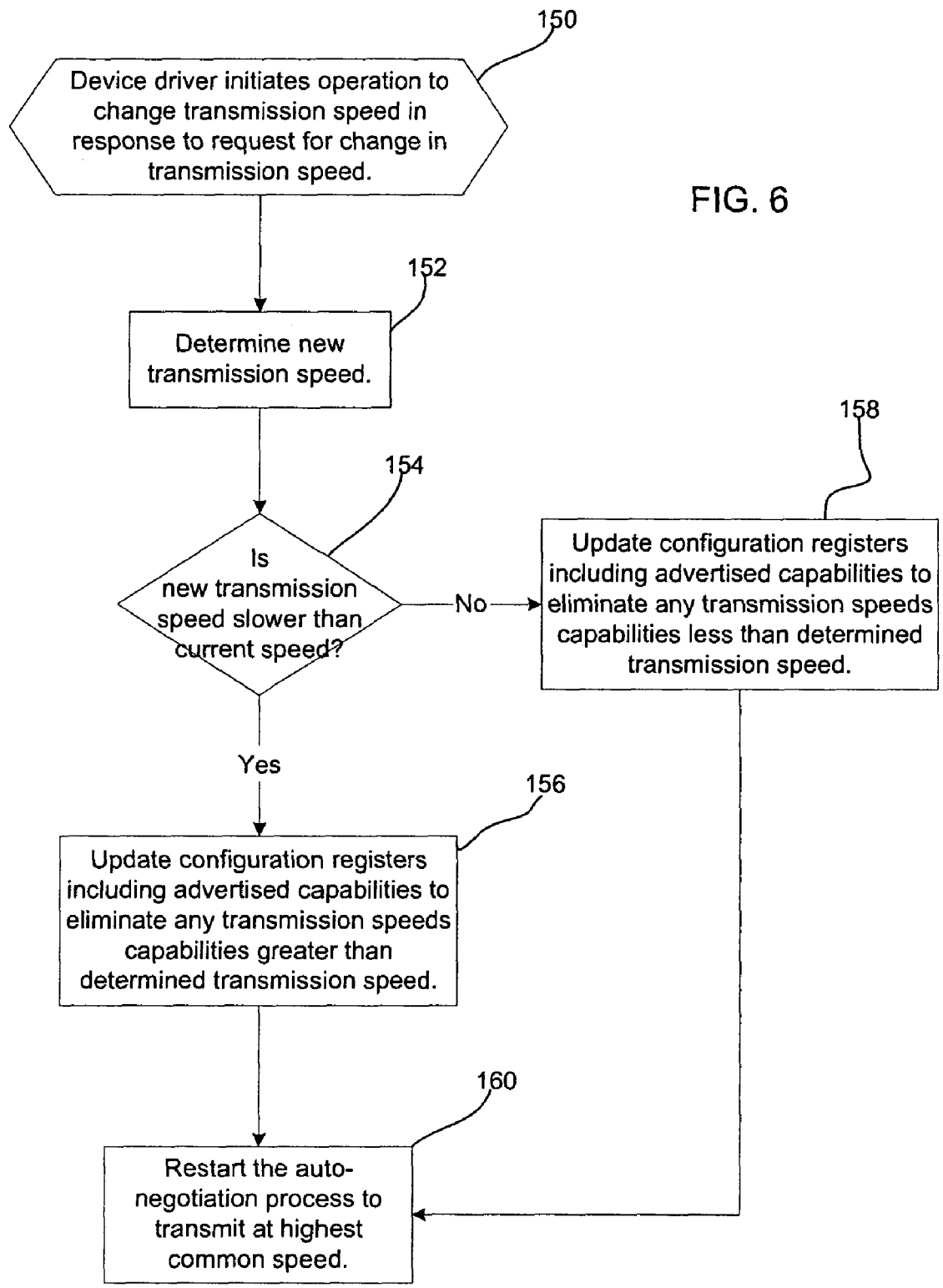

FIG. 6 illustrates logic implemented in the device driver 18a, 18b to initiate a speed change between the local network adaptor 10a, 10b and a linked network adaptor. The device drivers 18*a*, 18*b* may initiate an operation to change the speed in response to a request from an application 20*a*, 20*b* or in response to detecting a change in network traffic at the network adaptor 10*a*, 10*b*, as discussed above. For purposes of this description, device driver 18*a* will be described as the local device driver 18*a* in the local network adaptor 10*a* initiating the speed change operation and device driver 18*b* will be described as the linked device driver 18*b* in the linked network adaptor 10*b* that responds to the speed change request form the local network adaptor 10*a*. However, both device drivers 18*a*, 18*b* can function as the local and linked device drivers 18*a*, 18*b*. Upon initiating (at block 150) a speed change operation, the local device driver 18*a* determines (at block 152) the new transmission speed. In embodiments where the local device driver 18*a* detects the need to adjust the speed as a result of a predefined change in network traffic, the device driver 18*a* may include code to determine the appropriate new transmission speed for the detected change. Alternatively, if the application 20*a* calls an API to change the speed, then either the local device driver 18*a*, application 20*a* or the network protocol 12*a* may determine the new transmission speed.

If (at block 154) the new transmission speed is slower than the current transmission speed, then the device driver 18*a* calls (at block 156) the network protocol 12*a* to update the configuration registers 14*a* including advertised capabilities to eliminate any settings indicating transmission speeds capabilities greater than the determined transmission speed. Otherwise if the new transmission speed is greater than the current speed, then the device driver 18*a* calls the network protocol 12*a* to update (at block 158) the configuration registers 14*a* including advertised capabilities to eliminate any transmission speeds capabilities less than determined transmission speed. Before updating the transmission speed at blocks 156 or 158, the device driver 18*a* may reset the registers 14*a* including the advertised capabilities to the initial default values to undo any previous speed setting changes before the current updating is performed to eliminate advertised speed capabilities above or below the determined speed capability. From block 156 or 158, the device driver calls the network protocol 12*a* to restart (at block 160) the auto-negotiation process to negotiate with the linked network adaptor 10*b* to transmit at the highest common speed based on the new advertised capabilities of the local network adaptor 12*a* set by the device driver 18*a*. Thus, if the device driver 18*a* had eliminated the higher speed transmission in the advertised capabilities registers 14*a*, then the network adaptors 10*a*, 10*b* would establish communication at the highest common speed of the remaining speeds indicated in the capability registers 14*a* of the local network adaptor 10*a*.

In certain embodiments, the local device driver 18*a* may be aware of the transmission speed capabilities of the linked network adaptor 10*a*. In such embodiments, the local device driver 18*a* may set the new transmission speed to the next highest or lowest common speed depending on whether the speed adjustment is to increase or decrease the speed, respectively.

With the described embodiments of FIGS. 4 and 5, changing the network transmission speed can occur without any noticeable delay to the user because the request change is transmitted during normal packet transmissions within a packet or within a preamble, so that the change occurs almost immediately once the linked network adaptor determines that the requested new speed is supported and returns positive acknowledgment. Thus, the speed change request is transmitted without terminating the linked exchange occurring between the local and linked network devices. Once the positive acknowledgment is returned, both network adaptors may begin transmitting at the requested new transmission speed. Until the positive acknowledgment is returned, the network adaptors communicate using the previously negotiated transmission speed. The described embodiment of FIG. 6 may take longer to implement the new transmission speed than the embodiment of FIGS. 4 and 5 because the device driver causes the speed to change by restarting the auto-negotiation process to negotiate a speed with the new advertised capabilities of the network adaptor having fewer indicated capabilities. With the embodiment of FIG. 6, transmissions are delayed until the new transmission speed is auto-negotiated, which may be noticeable to a user. However, with FIG. 6, the speed change request occurs without terminating the linked exchange occurring between the local and linked network devices.

The described embodiments provide techniques to change the transmission speed used to transmit data between network adaptors. The described embodiments allows a change to a slower transmission speed if current network traffic is relatively low. Lowering the transmission speed can conserve energy consumed by the network adaptor, which may be important for portable devices and energy conservation. Moreover, the described embodiments allow an increase in the transmission speed in the event that traffic has increased at the network adaptor or an application program anticipates a need for additional network transmission speed and bandwidth to accommodate anticipated large data transmissions.

Additional Embodiment Details

The described techniques for changing the data transmission speed between network adaptors may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device driver 10*a*, 10*b* and network protocol 12*a*, 12*b*. In alternative embodiments, operations described as performed by the device driver 10*a*, 10*b* may be performed by the network protocol 12*a*, 12*b*, and vice versa.

In described embodiments, the speed adjustment to a higher or lower transmission speed may include going to a higher or lower megabits per second rate, going from either full duplex to half duplex, or vice versa, or changing to any transmission mode known in the art that is supported by the network adaptors and provides a higher or lower data transmission rate than the current transmission rate.

In the described embodiments, the network protocol comprised the Ethernet protocol. In alternative embodiments, the network protocol may comprise any network protocol known in the art, including Fibre Channel, Wireless Fidelity (WiFi), etc.

In the described embodiments, the network adaptors are shown as being included in different devices or enclosures. In alternative embodiments, the network adaptors may be included in a same device or enclosure.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the device driver and network adaptor embodiments may be implemented in a computer system including a video controller to render information to display on a monitor coupled to the computer system including the device driver and network adaptor, such as a computer system comprising a desktop, workstation, server, mainframe, laptop, handheld computer, etc. Alternatively, the network adaptor and device driver embodiments may be implemented in a computing device that does not include a video controller, such as a switch, router, etc.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, Wireless Fidelity (Wi-Fi), etc.

The illustrated logic of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   selectively determining a new transmission speed different from a current transmission speed between a local network device and a linked network device in response to a speed change event, and
   transmitting a speed change request and the new transmission speed to the linked network device to request the local and linked network devices to communicate at the new transmission speed, wherein the transmitting occurs while maintaining a linked exchange between the local and linked network devices.

2. The method of claim 1, wherein transmitting the speed change request comprises including the speed change request and the new transmission speed in a data packet being transmitted to the linked network device at the current transmission speed.

3. The method of claim 1, wherein transmitting the speed change request comprises including the speed change request and the new transmission speed in a preamble packet that is transmitted at the beginning of data packets or in an idle transmission between packets to synchronize data transmissions at the current transmission speed.

4. The method of claim 1, wherein the linked network device in response to the speed change request returns positive acknowledgment to the local network device if the linked network device is capable of transmitting at the new transmission speed.

5. The method of claim 4, wherein the local and linked network devices continue to transmit data at the current transmission speed until the linked network device returns a positive acknowledgment.

6. The method of claim 1, wherein the linked network device in response to the speed change request returns negative acknowledgment to the local network device if the linked network device is not capable of transmitting at the new transmission speed.

7. The method of claim 1, wherein the operation to change the transmission speed comprises an operation to either:
   increase the transmission speed if the local network device is capable of transmitting at a transmission speed that is higher than the current transmission speed; or
   decrease the transmission speed if the local network device is capable of transmitting at a transmission speed that is lower than the current transmission speed.

8. The method of claim 1, further comprising:
   maintaining transmission information indicating transmission capabilities of the linked network device, wherein the determined new transmission speed is a new transmission speed that the transmission information indicates that the linked network device is capable of performing.

9. The method of claim 1, further comprising setting a register in the local network device to indicate the new transmission speed, wherein a device driver used to communicate with the local network device determines the new transmission speed, wherein setting the register in the local network device comprises the device driver changing advertised capabilities of the local network device indicated in the register, and wherein transmitting the speed change request comprises restarting an auto-negotiation process that selects a common transmission speed based on the changed advertised capabilities in the local network device.

10. The method of claim 9, wherein the determined new transmission speed is higher than the current transmission speed, and wherein changing the advertised capabilities comprises removing any transmission speeds indicated in the advertised capabilities of the local network device that are less than the determined new transmission speed.

11. The method of claim 9, wherein the determined new transmission speed is lower than the current transmission speed, and wherein changing the advertised capabilities comprises removing any transmission speeds indicated in the advertised capabilities of the local network device that are higher than the determined new transmission speed.

12. The method of claim 1, wherein the speed change event comprises an application program determining an anticipated increase of data transmissions through the local network device, and wherein the new transmission speed is higher than the current transmission speed.

13. The method of claim 1, wherein the speed change event is based on a detected change in network traffic at the local network device.

14. A network device comprising:
   (i) logic to initiate an operation to change a current transmission speed at which data is transmitted to a linked network device in response to a speed change event
   (ii) logic to determine a new transmission speed different from a current transmission speed between the network device and the linked network device; and
   (iii) logic to transmit a speed change request and the new transmission speed to the linked network device to request the linked network device to communicate at the new transmission speed, wherein the transmission occurs while maintaining a linked exchange between the network device and the linked network device.

15. The network device of claim 14, wherein the linked network device in response to the speed change request, returns positive acknowledgment to the network device if the linked network device is capable of transmitting at the new transmission speed.

16. The network device of claim 15, wherein the network device and the linked network device continue to transmit data at the current transmission speed until the linked network device returns a positive acknowledgment.

17. The network device of claim 14, wherein the linked network device in response to the speed change request, returns negative acknowledgment to the network device if the linked network device is not capable of transmitting at the new transmission speed.

18. The network device of claim 14, further comprising logic to:
   increase the transmission speed if the network device is capable of transmitting at a transmission speed that is higher than the current transmission speed; or
   decrease the transmission speed if the network device is capable of transmitting at a transmission speed that is lower than the current transmission speed.

19. The network device of claim 14, further comprising logic to maintain transmission information indicating transmission capabilities of the linked network device, wherein the determined new transmission speed is a new transmission speed that the transmission information indicates that the linked network device is capable of performing.

20. The network device of claim 14, wherein the speed change event is based on a detected change in network traffic at the network device.

21. A computer system capable of communicating over a network with a device including a linked network device, comprising:
   a processing unit;
   a storage device;
   a storage controller to manage Input/Output (I/O) access to the storage device;
   a network device capable of receiving data from the processing unit and communicating with the linked network device over the network, the network device comprising:
      (a) logic to initiate an operation to change a current transmission speed at which data is transmitted to the linked network device in response to a speed change event;
      (b) logic to determine a new transmission speed different from the current transmission speed; and
      (c) logic to transmit a speed change request and the new transmission speed to the linked network device to request the linked network device to communicate at the new transmission speed, wherein the transmission occurs while maintaining a linked exchange between the network device and the linked network device.

22. The computer system of claim 21, wherein the network device further comprises:
   logic to set a register to indicate the new transmission speed and wherein the computer system further comprises logic to communicate with the network device to determine the new transmission speed, wherein the logic to set the register comprises logic to change advertised capabilities of the network device indicated in the register, and wherein the logic to transmit the speed change request comprises logic to restart an auto-negotiation process that selects a common transmission speed based on the changed advertised capabilities in the network device.

23. A storage device to store code capable of causing operations in a local network device, the operations comprising:
   determining a new transmission speed different from a current transmission speed; and
   transmitting a speed change request and the new transmission speed to the linked network device to request the local and linked network devices to communicate at the new transmission speed, wherein the transmitting occurs while maintaining a linked exchange between the local and linked network devices.

24. The storage device of claim 23, wherein the code causes the local network device to include the speed change request and the new transmission speed in a data packet being transmitted to the linked network device at the current transmission speed.

25. The storage device of claim 23, wherein the code causes the local network device to include the speed change request and the new transmission speed in a preamble packet that is transmitted to the linked network device at the beginning of data packets or in an idle transmission between packets to synchronize data transmissions at the current transmission speed.

26. The storage device of claim 23, wherein the linked network device is to return, in response to the speed change request, positive acknowledgment to the local network device if the linked network device is capable of transmitting at the new transmission speed.

27. The storage device of claim 26, wherein the code causes the local and linked network devices to continue to transmit data at the current transmission speed until the linked network device returns a positive acknowledgment.

28. The storage device of claim 23, wherein the linked network device is to return negative acknowledgment to the local network device, in response to the speed change request, if the linked network device is not capable of transmitting at the new transmission speed.

29. The storage device of claim 23, wherein the code causes the local network device to either:

increase the transmission speed if the local network device is capable of transmitting at a transmission speed that is higher than the current transmission speed; or decrease the transmission speed if the local network device is capable of transmitting at a transmission speed that is lower than the current transmission speed.

30. The storage device of claim 23, wherein the code causes the local network device to:

maintain transmission information indicating transmission capabilities of the linked network device, wherein the determined new transmission speed is a new transmission speed that the transmission information indicates that the linked network device is capable of performing.

31. The storage device of claim 23, further comprising code capable of causing the local network device to set a register in the local network device to indicate the new transmission speed and wherein the code comprises a device driver to communicate with the local network device to determine the new transmission speed, wherein to set the register in the local network device comprises the device driver changing advertised capabilities of the local network device indicated in the register, and wherein transmitting the speed change request comprises restarting an auto-negotiation process that selects a common transmission speed based on the changed advertised capabilities in the local network device.

32. The storage device of claim 31, wherein the determined new transmission speed is higher than the current transmission speed, and wherein changing the advertised capabilities comprises removing any transmission speeds indicated in the advertised capabilities of the local network device that are less than the determined new transmission speed.

33. The storage device of claim 31, wherein the determined new transmission speed is lower than the current transmission speed, and wherein changing the advertised capabilities comprises removing any transmission speeds indicated in the advertised capabilities of the local network device that are higher than the determined new transmission speed.

34. The storage device of claim 23, wherein the speed change event comprises an application program determining an anticipated increase of data transmissions through the local network device, and wherein the new transmission speed is higher than the current transmission speed.

35. The storage device of claim 23, wherein the speed change event comprises detecting a change in network traffic at the local network device.

36. The method of claim 1, wherein the speed change event is based on a change in desired power consumption.

37. The method of claim 1, wherein the speed change event is based on a detected change in network conditions.

38. The method of claim 1, wherein the local and linked network devices interact based on the speed change request at the current transmission speed.

39. The network device of claim 14, wherein the speed change event is based on a change in desired power consumption.

40. The network device of claim 14, wherein the speed change event is based on a detected change in network conditions.

41. The network device of claim 14, wherein the network device and the linked network device interact based on the speed change request at the current transmission speed.

42. The computer system of claim 21, wherein the speed change event is based on a change in desired power consumption.

43. The computer system of claim 21, wherein the speed change event is based on a detected change in network conditions.

44. The computer system of claim 21, wherein the network device and the linked network device interact based on the speed change request at the current transmission speed.

45. The article of manufacture of claim 23, wherein the speed change event is based on a change in desired power consumption.

46. The article of manufacture of claim 23, wherein the speed change event is based on a detected change in network conditions.

47. The article of manufacture of claim 23, wherein the local and linked network devices interact based on the speed change request at the current transmission speed.

48. A system comprising:
a linked device; and
a local device comprising:
logic to initiate an operation to change a current transmission speed at which data is transmitted to the linked device in response to a speed change event,
logic to determine a new transmission speed different from a current transmission speed between the local device and the linked device, and
logic to transmit a speed change request and the new transmission speed to the linked device to request the linked device to communicate at the new transmission speed, wherein the transmission occurs while maintaining a linked exchange between the local device and the linked device.

49. The system of claim 48, wherein the local and linked network devices interact based on the speed change request at the current transmission speed.

50. The system of claim 48, wherein the transmission occurs at the current transmission speed.

51. The system of claim 48, wherein the speed change event is based on a change in desired power consumption.

52. The system of claim 48, wherein the speed change event is based on a detected change in network conditions.

* * * * *